United States Patent [19]

Forster et al.

[11] Patent Number: 5,036,477
[45] Date of Patent: Jul. 30, 1991

[54] METHOD FOR THE INTERFERENCE SUPPRESSION IN ULTRASONIC DISTANCE MEASUREMENTS

[75] Inventors: Alfred Forster, Schwandorf; Gerd Schorner, Amberg, both of Fed. Rep. of Germany

[73] Assignee: Siemens Aktiengesellschaft, Berlin & Munich, Fed. Rep. of Germany

[21] Appl. No.: 365,415

[22] Filed: Jun. 13, 1989

[30] Foreign Application Priority Data

Jun. 13, 1988 [DE] Fed. Rep. of Germany ....... 3820103

[51] Int. Cl.$^5$ .................. G06F 15/20; G06G 7/12
[52] U.S. Cl. ............................ 364/567; 73/602;
364/571.01; 364/575
[58] Field of Search .............. 73/602, 597, 613;
367/87, 93, 108, 151, 94, 96, 901; 364/560–563,
571.01, 571.08, 574, 575; 307/263

[56] References Cited

U.S. PATENT DOCUMENTS

| | | | |
|---|---|---|---|
| 4,243,935 | 1/1981 | McCool et al. | 367/901 |
| 4,352,094 | 9/1982 | Reneric | 364/575 |
| 4,573,133 | 2/1986 | White | 364/571.04 |
| 4,583,184 | 4/1986 | Murase | 364/575 |
| 4,596,144 | 6/1986 | Panton et al. | 73/620 |
| 4,630,226 | 12/1986 | Tanaka | 364/561 |
| 4,649,527 | 3/1987 | Forster et al. | 367/108 |
| 4,684,989 | 8/1987 | Roeder et al. | 364/575 |
| 4,736,414 | 4/1988 | Montagna et al. | 364/724.16 |
| 4,800,540 | 1/1989 | Annala | 367/87 |
| 4,805,129 | 2/1989 | David | 364/724.16 |
| 4,933,914 | 6/1990 | Feintuch et al. | 367/901 |

FOREIGN PATENT DOCUMENTS 0174090 3/1986 European Pat. Off. .
2568687 2/1986 France .
2129935 5/1984 United Kingdom .

OTHER PUBLICATIONS

Ultrasonics, vol. 11, No. 4, Jul. 1973, pp. 165-173, Guilford, Surrey, GB; S. Lees et al.: "DONAR: a computer processing system to extend ultrasonic pulse-echo testing".

Primary Examiner—Kevin J. Teska
Attorney, Agent, or Firm—Kenyon & Kenyon

[57] ABSTRACT

In measuring distance with an ultrasonic proximity initiator stochastic interference signals can cause false pulses which have been suppressed largely by pulse width evaluation. While limiting false releases based on false pulses, the evaluation of the echo signal has been coarse because the amplitude of the pulses is not evaluated. This shortcoming is eliminated by sampling the analog echo signal at the ultrasonic proximity initiator at given time intervals and then subsequently converting the sampled values into digital values. This step is followed by a program controlled mathematical combining of the new digital values with digital values stored in a data memory that were derived from corresponding times in previous echo signals. The new digital values produced by the mathematical combination are stored in a data memory and evaluated with respect to amplitude or pulse width to determine distance. The distance thus obtained is displayed for each pulse cycle. The method can be used in ultrasonic proximity initiators for measuring distance.

8 Claims, 2 Drawing Sheets

METHOD FOR THE INTERFERENCE SUPPRESSION IN ULTRASONIC DISTANCE MEASUREMENTS

BACKGROUND OF THE INVENTION

The present invention relates to a method and apparatus for suppressing stochastic interference signals in ultrasonic distance measurements. The apparatus comprises an ultrasonic proximity initiator that repeatedly sends out ultrasonic pulses of equal width and receives corresponding echo signals that are evaluated in a control and evaluating unit. Stochastic interference appears as deviations in the echo signals as measured relative to the emitted ultrasonic pulses. These deviations are compensated for in the distance determination.

Methods for suppressing the foregoing type of interference are known, for instance, from U.S. Pat. No. 4,649,527, corresponding to DE 3,428,773. This reference distinguishes false pulses based on pulse width since false pulses can be recognized as being wider or narrower than the emitted ultrasonic pulses, all of which have an equal width. While effective at limiting false releases, this method has the disadvantage that the evaluation is only very coarse as to whether or not an echo signal carries interference since the information contained in the amplitude of the echo signal is not considered.

SUMMARY OF THE INVENTION

The present invention provides an improved method for suppressing stochastic interference signals in distance measurements by means of an ultrasonic proximity initiator that avoids false reports or false switching actions.

The method of the present invention involves a simple intermediate processing step in which the analog echo signal is processed as a pulse train at the output of the ultrasonic proximity initiator before it is fed to the control and evaluating unit. The intermediate processing samples the echo signal at equal intervals for each pulse train, converts the analog sample values into digital values, and then combines these digital sample values with digital values determined for equivalent points in time that were stored from the preceding echo signals. The result is mathematically processed to form new digital values. The digital sample values and the stored digital values that correspond in time are weighted to a desired magnitude and then stored as new digital values to replace the previous digital values. In addition, the digital values are fed to the control and evaluating unit for further evaluation with respect to amplitude or pulse width. Mathematically combining the weighted sample values with the values stored previously involves forming mean values from the digital values in a particularly simple, easily realized logical combination. It is advantageous to sample each echo signal at equal time intervals so that the sampling can be done together with the sampling of each pulse train at low cost.

The circuit arrangement needed to implement the foregoing method comprises an intermediate processing unit connected between a control and evaluating unit and the output of the ultrasonic proximity initiator. The intermediate processing unit comprises an analog to digital converter having an integrated sampling device, a processor, a data memory, and a program memory, with the analog to digital converter being connected between the proximity initiator and the processor, with the latter being electrically connected to the program memory, the data memory, and the control and evaluating unit.

DETAILED DESCRIPTION

Figure 1:
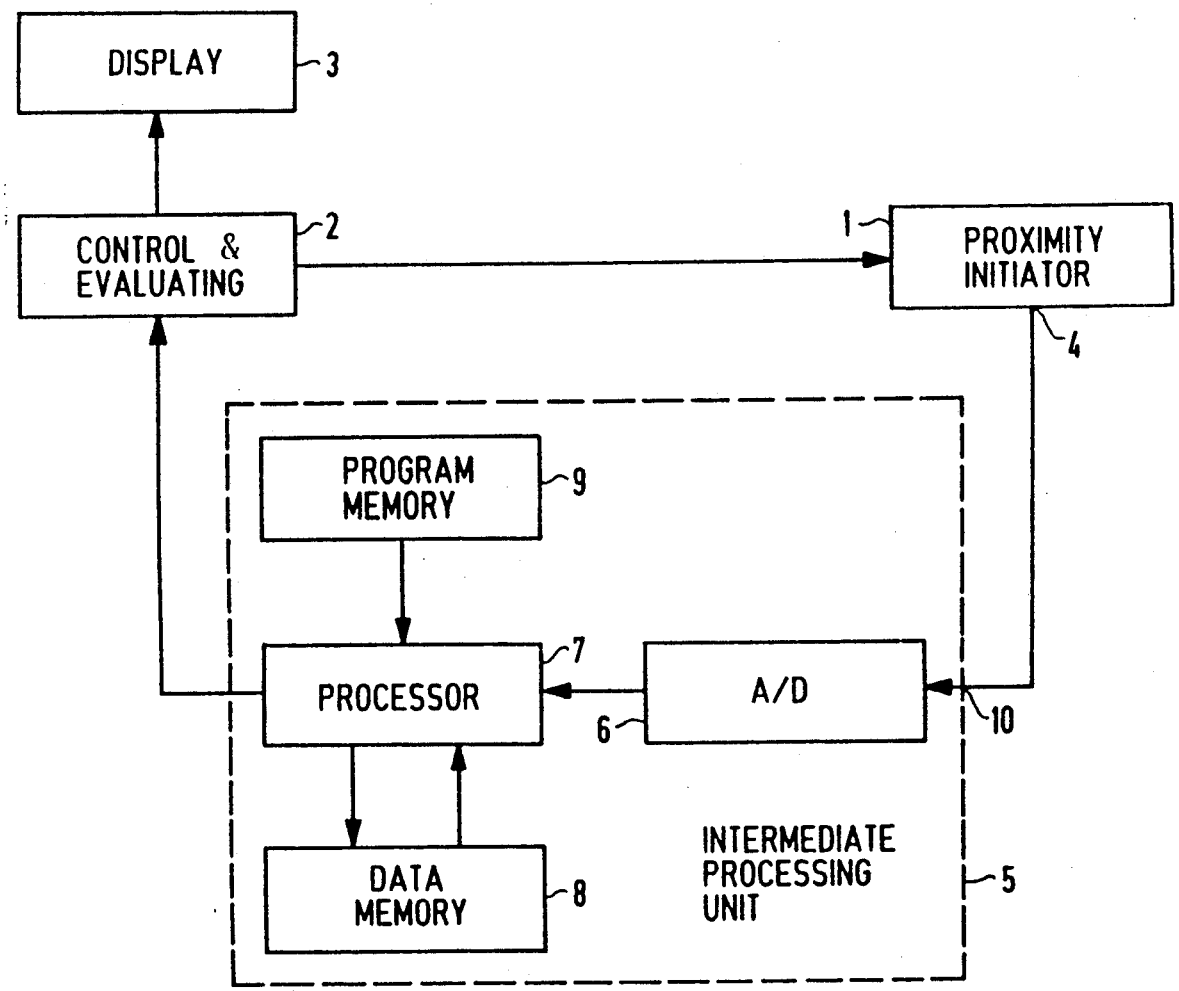
FIG. 1 shows a block diagram of a device for ultrasonic distance measurement in accordance with the present invention.

The device for ultrasonic distance measurement according to the present invention as shown in FIG. 1, comprises an ultrasonic proximity initiator 1, a control and evaluating unit 2, a display unit 3, and an intermediate processing unit 5 which is connected between the ultrasonic proximity initiator 1 and the control and evaluating unit 2. Intermediate processing unit 5 comprises an analog-digital converter 6 having an integrated sampling device, a processor 7, a data memory 8, and a program memory 9. The analog-digital converter 6 is connected to the input 10 of the intermediate processing unit 5. The output of A/D converter 6 is connected to an input of the processor 7, the output of which is in turn connected to the control and evaluating unit 2. The data memory 8 and the program memory 9 are electrically connected with the processor 7.

The control and evaluating unit 2 causes the ultrasonic proximity initiator 1 to cyclically emit ultrasonic pulses of equal width and to receive corresponding echo signals. The analog signal present at the output 4 of the ultrasonic proximity initiator 1 is sampled from the instant at which the emission of the ultrasonic pulse ends. The sampling takes place up to the point in time at which the emission of the next ultrasonic pulse begins. The sampling takes place at equal time intervals. The sampled analog values are digitalized in the analog-digital converter 6 and passed on to the processor 7. These digitalized sampled values are mathematically combined via the processor 7 with the time equivalent digital values that are stored in the data memory 8.

The time intervals between the sampling depend on the kind of mathematical combination chosen and on the components executing the combination. For simple combinations, time intervals of less than, say, thirty to fifty us can be achieved. A program in program memory 9 controls the combination that is executed in the processor 7. In the simplest case, the corresponding digital values are combined with each other by an average value former in which the digital sampling values stored in data memory 8 can be weighted differently from the last digital sampling values.

Figure 2:
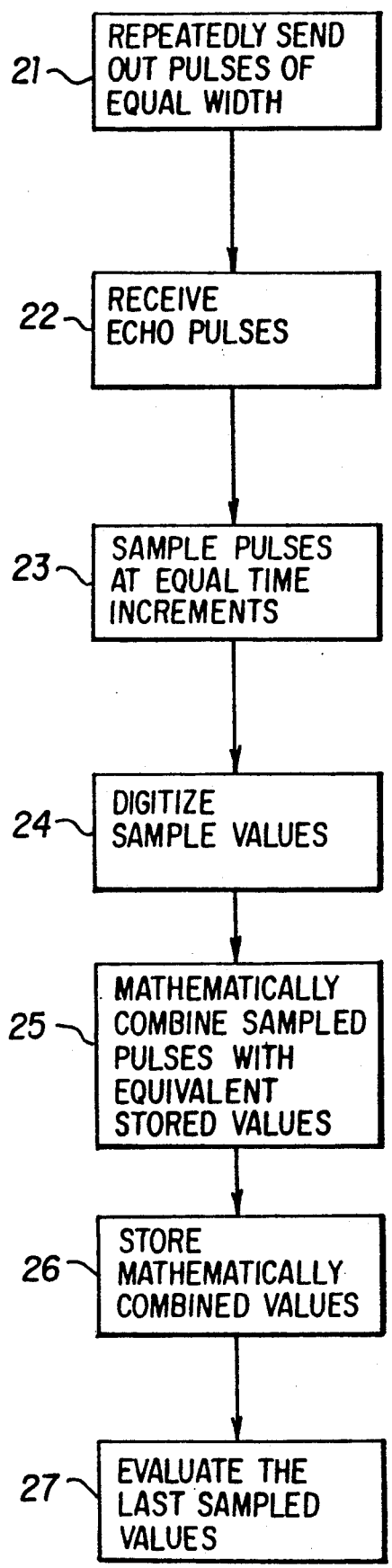
FIG. 2 is a flow diagram illustrating the method according to the present invention.

The present invention can be understood with the aid of the following example. Let the current digital sample value be 1 and the corresponding stored digital value be 3. If the weighting factor for the stored digital values is 4 and the last sample value is 1, a new value of 2.6 is obtained by forming an average. The digital values obtained in this manner replace the digital values stored in the data memory 8 from previous times. In addition, the new digital values are passed from the processor 7 to the control and evaluating unit 2 where they are evaluated and the object distance determined in the usual manner from the time duration between the emission of the ultrasonic pulse and the reception of the corresponding echo signal. In other words, as illustrated by FIG. 2, the proximity initiator of FIG. 1 repeatedly sends out ultrasonic pulses of equal width as indicated by block 21. Then, as indicated by block 22, these pulses are received, following which, as indicated by block 23, the received echo signal is sampled at equal time intervals at analog to digital converter 6. After this, in accordance with block 24, the analog values are digitized. In accordance with block 25, utilizing processor 7, the new digital values are combined with stored values for the equivalent time. This includes the weighting of the previous and new values in the manner described above. Following this combining, the new values are stored as indicated by block 26. Finally, as indicated by block 27, the newly received values are evaluated in the control and evaluating unit 2, both with regard to pulse width and with regard to pulse amplitude, using, as a reference, the stored values. A conventional pulse width evaluation is performed to recognize the echo signal. The amplitude of the digital values is also evaluated according to the invention. For this purpose a limit is given which is as high as possible but is still less than the amplitude furnished for the echo signal. Only the pulses above the limit are evaluated so that pulses below the limit, such as stochastic interference signals, are suppressed. In this manner the echo signal can determine the object range with greater freedom from interference.

The next distance value can be determined using the foregoing procedure on the basis of the following echo signal. The determined distance value can be displayed on a display unit 3 which is connected to the control and evaluating unit 2. It is also possible to connect an electronic switch to the control and display unit 2 to perform the switching if the value exceeds or falls below a given limit.

We claim:

1. A method for suppressing stochastic interference signals in ultrasonic distance measurements made with a device comprising an ultrasonic proximity initiator and a control and evaluating unit, comprising the steps of:
repeatedly sending out ultrasonic pulses of equal width with the ultrasonic proximity initiator;
receiving echo signals corresponding to the pulses with the ultrasonic proximity initiator; and
compensating for deviations of the echo signals relative to the emitted ultrasonic pulses caused by stochastic interference signals, the compensating comprising the steps of:
processing the echo signals as a pulse train;
feeding the pulse train to the control and evaluating unit;
sampling the pulse train at equal, discrete time intervals to form analog sample values;
converting the analog sample values into digital sample values;
weighting the digital sample values;
weighting previous digital sample values stored in memory for equivalent equal, discrete time intervals from at least one previous pulse trains;
forming new digital sample values by mathematically combining the digital sample values with the corresponding previous digital values;
storing the new digital values in place of the previous digital values; and
feeding the new digital values to the control and evaluating unit for further evaluation with respect to amplitude or pulse width.

2. A method as claimed in claim 1, further comprising the step of sampling each echo signal at equal time intervals.

3. A method as claimed in claim 2, wherein the step of sampling each echo signal at equal time intervals begins when the ultrasonic proximity initiator stops emitting ultrasonic pulses.

4. A method according to claim 1, wherein the step of forming the new digital sample values includes the step of averaging the digital sample values with the corresponding previous digital sample values stored in memory.

5. A method as claimed in claim 4, further comprising the step of sampling each echo signal at equal time intervals.

6. A method as claimed in claim 5, wherein the step of sampling each echo signal at equal time intervals begins when the ultrasonic proximity initiator stops emitting ultrasonic pulses.

7. An apparatus for determining distance with ultrasonic pulses, comprising:
an ultrasonic proximity initiator;
a control and evaluating unit; and
an intermediate processing unit connected between the ultrasonic proximity indicator and the control and evaluating unit, the intermediate processing unit comprising:
a program memory;
a data memory;
a processor electrically connected to the program memory, the data memory and the control and evaluating unit; and
an analog/digital converter connected between the ultrasonic proximity indicator and the processor.

8. An apparatus for determining distance with ultrasonic pulses comprising:
an ultrasonic proximity initiator repeatedly sending ultrasonic pulses of equal width and receiving echo signals corresponding to the pulses which are sent out;
a control and evaluating unit receiving and evaluating the received pulses; and
an intermediate processing unit connected between the ultrasonic proximity indicator and the control and evaluating unit, the intermediate processing unit comprising:
a program memory;
a data memory;
a processor electrically connected to the program memory, the data memory and the control and evaluating unit; and
an analog to digital converter connected between the ultrasonic proximity indicator and the processor, said processor:
processing the echo signals as a pulse train;
feeding the pulse train to the control and evaluating unit;
sampling the pulse train at equal, discrete time intervals to form analog sample values;
converting the analog sample values into digital sample values;
weighting the digital sample values;
weighting previous digital sample values stored in memory for equivalent equal, discrete time intervals from a previous pulse trains;
forming new digital sample values by mathematically combining the digital sample values with the corresponding previous digital values;
storing the new digital values in place of the previous digital values; and
feeding the new digital values to the control and evaluating unit for further evaluation with respect to amplitude or pulse width.

* * * * *